(12) United States Patent
Andersson et al.

(10) Patent No.: US 12,467,699 B2
(45) Date of Patent: Nov. 11, 2025

(54) DOUBLE WALL PLATE HEAT EXCHANGER

(71) Applicant: SWEP INTERNATIONAL AB, Landskrona (SE)

(72) Inventors: Sven Andersson, Hässleholm (SE); Tomas Dahlberg, Helsingborg (SE)

(73) Assignee: SWEP INTERNATIONAL AB, Landskrona (SE)

( * ) Notice: Subject to any disclaimer, the term of this patent is extended or adjusted under 35 U.S.C. 154(b) by 364 days.

(21) Appl. No.: 18/015,862

(22) PCT Filed: Jul. 2, 2021

(86) PCT No.: PCT/SE2021/050669
§ 371 (c)(1),
(2) Date: Jan. 12, 2023

(87) PCT Pub. No.: WO2022/015217
PCT Pub. Date: Jan. 20, 2022

(65) Prior Publication Data
US 2023/0258414 A1    Aug. 17, 2023

(30) Foreign Application Priority Data

Jul. 17, 2020  (SE) .................................. 2050906-3

(51) Int. Cl.
*F28F 3/00* (2006.01)
*F28D 9/00* (2006.01)
*F28F 3/04* (2006.01)

(52) U.S. Cl.
CPC .............. *F28F 3/005* (2013.01); *F28D 9/005* (2013.01); *F28F 3/046* (2013.01); *F28F 2265/16* (2013.01)

(58) Field of Classification Search
CPC ........ F28F 3/005; F28F 3/046; F28F 2265/16; F28F 2215/10; F28F 3/04; F28F 3/08;
(Continued)

(56) References Cited

U.S. PATENT DOCUMENTS 5,178,207 A      1/1993  Bergqvist et al.
6,662,862 B1 *  12/2003  Lindholm ............... F28D 9/005
                                                         165/70
(Continued)

FOREIGN PATENT DOCUMENTS

DE       3903084 A1    8/1998
EP       1811255 A2    7/2007
(Continued)

OTHER PUBLICATIONS

PCT International Search Report for PCT Application No. PCT/SE2021/050669 mailed on Oct. 4, 2021 (4 pages).
(Continued)

*Primary Examiner* — Steve S Tanenbaum
(74) *Attorney, Agent, or Firm* — Merchant & Gould P.C.

(57) ABSTRACT

A double wall plate heat exchanger (100) comprising a plurality of double wall plate heat exchanger elements (110, 120) formed with a ridges (R) and grooves (G) providing contact points between neighboring heat exchanger elements (110, 120) under formation of flow channels between them for fluids to exchange heat. The flow channels are in selective fluid communication with each other through port openings. Each of the heat exchanger elements (110, 120) comprises at least two joined plates and leakage channels are formed between the plates of each heat exchanger element (110, 120) for fluid leaking from a flow channel. The plates are provided with cooperating elevations (190) and indentations (200) forming leakage channels (210) extending across the ridges and grooves between the plates of each heat exchanger element (110, 120). At least one connecting space is formed between the plates to connect the leakage channels within the same heat exchanger element (110, 120), and each of the connecting spaces is connected to a leakage outlet.

15 Claims, 6 Drawing Sheets

(58) Field of Classification Search
CPC ........ F28F 27/00; F28D 9/005; F28D 9/0031; F28D 9/00
USPC .......................................................... 165/70
See application file for complete search history.

(56) References Cited

U.S. PATENT DOCUMENTS

| | | |
|---|---|---|
| 2007/0169916 A1 | 7/2007 | Wang et al. |
| 2011/0088882 A1 | 4/2011 | Persson |
| 2012/0267084 A1 | 10/2012 | Crawford |
| 2013/0206359 A1 | 8/2013 | Bertilsson et al. |
| 2016/0040943 A1* | 2/2016 | Han ........................ F28D 9/005 165/157 |

FOREIGN PATENT DOCUMENTS

| | | |
|---|---|---|
| EP | 2267391 A2 | 12/2010 |
| JP | 2012127597 A | 7/2012 |
| WO | 0116544 A1 | 3/2001 |
| WO | 2012004100 A1 | 1/2012 |

OTHER PUBLICATIONS

Written Opinion of the International Searching Authority for PCT/SE2021/050669 mailed on Oct. 4, 2021 (6 pages).

* cited by examiner

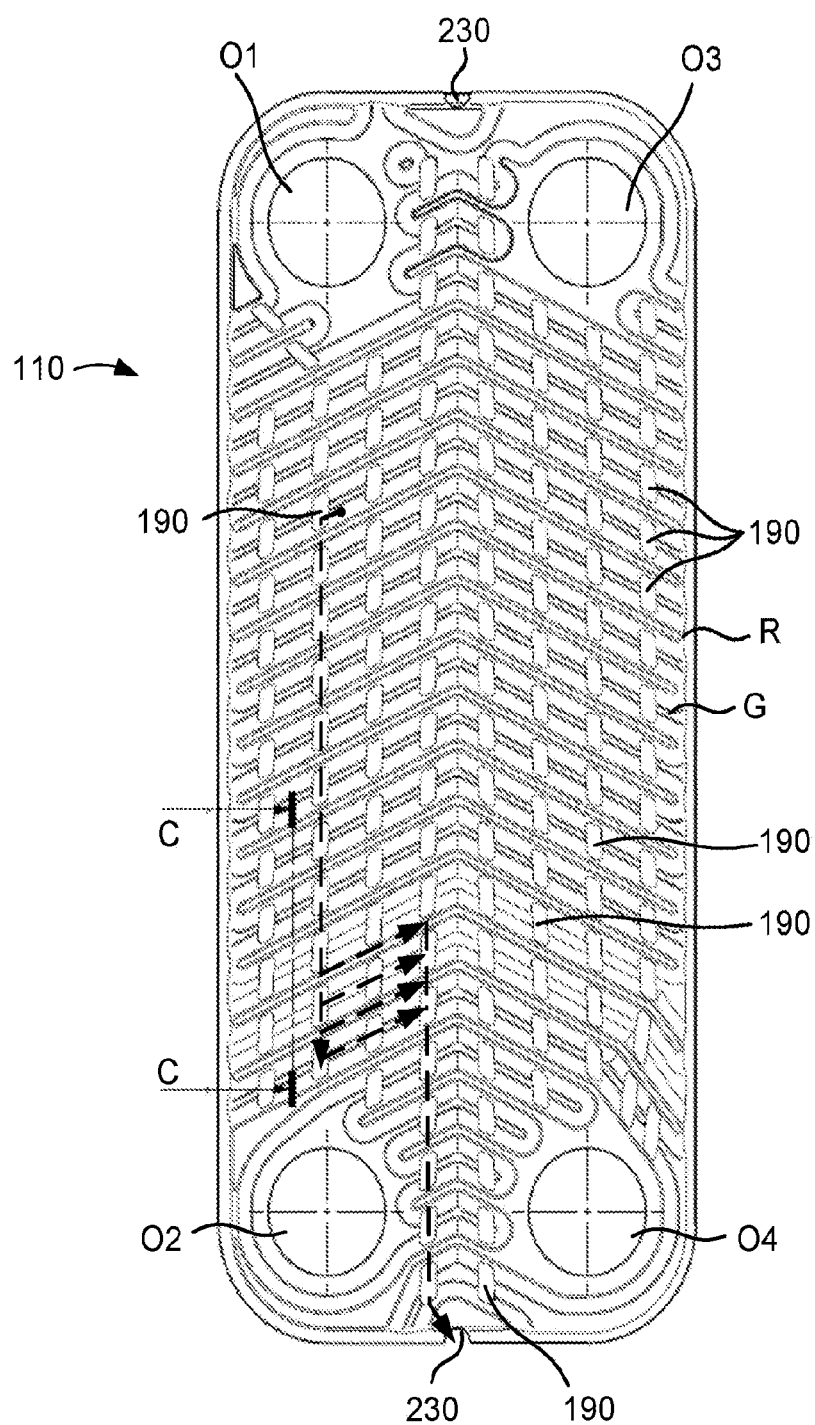
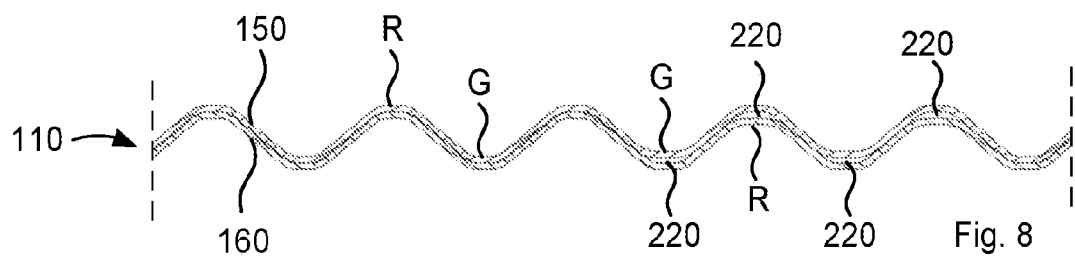
Fig. 7
Fig. 8

DOUBLE WALL PLATE HEAT EXCHANGER

This application is a National Stage Application of PCT/SE2021/050669, filed 2 Jul. 2021, which claims benefit of Serial No. 2050906-3, filed 17 Jul. 2020 in Sweden, and which applications are hereby incorporated by reference in their entireties. To the extent appropriate, a claim of priority is made to each of the above disclosed applications.

FIELD OF THE INVENTION

The present invention relates to a double wall plate heat exchanger. More specifically, the present invention is related to a double wall plate heat exchanger, comprising a plurality of double wall plate heat exchanger elements, wherein the double wall plate heat exchanger elements are formed with ridges and grooves providing contact points between at least some crossing ridges and grooves of neighbouring double wall plate heat exchanger elements under formation of flow channels between the double wall plate heat exchanger elements for fluids to exchange heat, said flow channels being in selective fluid communication with each other through port openings of the double wall plate heat exchanger elements, wherein each of the double wall heat exchanger elements comprises two plates, wherein said plates are formed with ridges and grooves to form the pattern of ridges and grooves of the double wall heat exchanger elements, and wherein leakage channels are formed between the plates of each double wall plate heat exchanger element for fluid leaking from a flow channel.

Double wall plate heat exchangers are generally used to avoid one fluid from leaking into another in the heat exchanger. For example, such double wall plate heat exchangers are useful for heat exchange applications involving a fluid for human consumption, such as liquid foodstuff, or fluids which can result in an undesirable chemical reaction when mixed, etc. Double wall plate heat exchangers can also be useful when detection of a leak of one fluid into the other is desirable.

PRIOR ART

A plurality of different types of brazed double wall plate heat exchangers can be found in the prior art. As known by persons skilled in the art, such heat exchangers comprise a number of double wall heat exchanger elements formed by two joined plates, wherein said plates are formed with ridges and grooves to form a pattern of ridges and grooves of the double wall heat exchanger elements, and wherein leakage channels are formed between the plates of each double wall plate heat exchanger element to collect fluid leaking from a flow channel and conduct it to the periphery of the plate.

One problem with double wall plate heat exchangers of prior art is that they can be inefficient and unreliable.

Another problem with such prior art double wall plate heat exchangers is that it can be difficult to detect a leak.

Yet another problem with such prior art double wall plate heat exchangers is that they can be difficult and complicated to produce.

SUMMARY OF THE INVENTION

An object of the present invention is to overcome or at least alleviate the above-mentioned problems and provide a reliable and efficient double wall plate heat exchanger with facilitated leak detection, which is easy to produce.

The present invention is related to a double wall plate heat exchanger comprising a plurality of double wall heat exchanger elements, wherein the double wall heat exchanger elements are formed with a pattern of ridges and grooves providing contact points between at least some crossing ridges and grooves of neighbouring heat exchanger elements under formation of flow channels between the double wall plate heat exchanger elements for fluids to exchange heat, said flow channels being in selective fluid communication with each other through port openings of the double wall heat exchanger elements, wherein each of the double wall heat exchanger elements comprises at least two joined plates, wherein said plates are formed with ridges and grooves to form the pattern of ridges and grooves of the double wall heat exchanger elements, and wherein leakage channels are formed between the plates of each double wall plate heat exchanger element for fluid leaking from a flow channel, characterised in that the plates are provided with cooperating elevations and indentations forming leakage channels extending across the ridges and grooves between the plates of each double wall heat exchanger element, at least one connecting space is formed between the plates of each double wall heat exchanger element, said connecting space connecting leakage channels within the same double wall heat exchanger element, and the connecting spaces are connected to a leakage outlet. The combination of leakage channels across the ridges and grooves and a connecting space connecting the leakage channels results in that leaking fluid can be collected in an efficient manner and e.g. guided towards a single leakage outlet or a few leakage outlets in the desired location or locations, wherein detecting of leakage can be facilitated. Hence, the connecting spaces can be connected to a defined leakage area, whereas the leakage of the prior art is non-defined or spread out. The leakage channels connected to the connecting space according to the invention also results in that double wall plate heat exchangers can be produced in an efficient and reliable manner by brazing as brazing material can be applied in a simple manner and stop off can be excluded. The leakage channels can be made relatively narrow to provide for efficient heat transfer.

The connecting space(s) can extend along a ridge and/or groove of the plates. Hence, the leakage channels arranged across the ridges and grooves are connected to each other through the connecting space extending along the ridge(s) and/or groove(s), wherein fluid from any leakage channel can reach a single or a few leakage outlets through the connecting space(s). The connecting space(s) can be formed by a ridge being formed with a lower height than the corresponding ridge of the adjacent plate, wherein the connecting space is formed between the lower ridge being received in the taller ridge (or similar for a groove). Hence, the connecting space is formed in an efficient and reliable manner. Also the connecting spaces can be limited to a single or a few so as to maintain a high efficiency of the heat exchange. Hence, a large heat exchange area can be maintained as a plurality of, the majority of or almost all of the ridges and grooves are not provided with connecting spaces and are in contact with each other. Also, a strong heat exchanger is obtained as conventional brazing points can be provided between the ridges and grooves being in contact with each other in the double wall heat exchanger element.

The plates can be rectangular, wherein the leakage outlet can be arranged in a short side. Hence, leaking fluid can be guided to a single leakage outlet at the short side of the heat exchanger which further facilitates leakage detection. Hence, the long sides of the plates can be joined by brazing, such as in a conventional manner, e.g. with a continuous brazing joint on the long sides, wherein the heat exchanger can be made strong and can be produced in an efficient manner.

The plates can be provided with a peripheral skirt, wherein the skirt of three consecutive plates can be provided with an aperture forming a common leakage outlet from the leakage channels of two adjacent double wall plate heat exchanger elements. For example, the apertures can be aligned. The apertures can be arranged in a short side of the plates. Hence, leakage can be collected in one or a few positions for facilitated and more reliable detection while the major part of the periphery of the plates, e.g. including the entire long sides, can be joined by brazing to provide a strong heat exchanger and efficient production.

The heat exchanger can be provided with a leakage sensor, such as a conventional leakage sensor. The leakage sensor can be provided at the leakage outlet, such as in a defined position or a few defined positions at the periphery of the heat exchanger, wherein efficient and reliable leakage detection is achieved. For example, the leakage sensor can be attached to the outer periphery of the heat exchanger.

Further characteristics and advantages of the present invention will become apparent from the description of embodiments below, the appended drawings and the dependent claims.

BRIEF DESCRIPTION OF THE DRAWINGS

In the following, the invention will be described with reference to appended drawings, wherein:

FIG. 7 is a schematic front view of a double wall plate heat exchanger element, FIG. 8 is a schematic section view along the line C-C of FIG. 7, illustrating a connecting space along two ridges and two grooves according to one embodiment.

DESCRIPTION OF EMBODIMENTS

Figure 1:
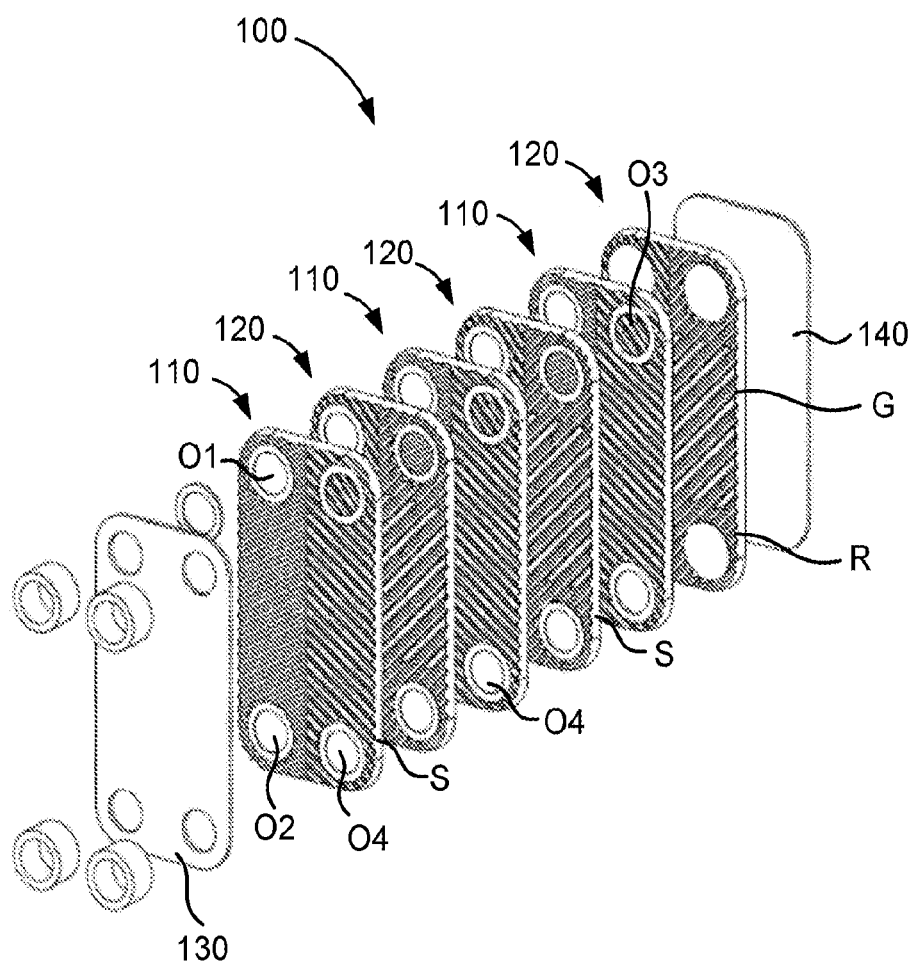
FIG. 1 is a schematic and exploded perspective view of an example of a plate heat exchanger.

With reference to FIG. 1 a brazed plate heat exchanger 100 is illustrated according to one embodiment example.

The heat exchanger 100 comprises a plurality of first plate heat exchanger elements 110 and a plurality of second plate heat exchanger elements 120 stacked in a stack to form the heat exchanger 100. For example, the heat exchanger elements 110, 120 are identical. Alternatively, the heat exchanger elements are not identical, wherein the heat exchanger 100 comprises at least two, three or four different heat exchanger elements 110, 120. The heat exchanger 100 is a double wall heat exchanger, wherein each of the heat exchanger elements 110, 120 comprises two plates joined together to form the heat exchanger element 110, 120, which will be described more in detail below. Hence, the first heat exchanger element 110 is a first double wall plate heat exchanger element and the second heat exchanger element 120 is a second double wall plate heat exchanger element. For example, the heat exchanger 100 is a symmetric heat exchanger. Alternatively, the heat exchanger is an asymmetric heat exchanger, wherein the heat exchanger comprises at least two different heat exchanger elements 110, 120.

The heat exchanger elements 110, 120 are made from sheet metal, such as copper or stainless steel, and are provided with a pressed pattern of elevations and depressions. For example, the heat exchanger elements are made from copper or austenitic stainless steel having a thickness of 0.1 to 2 mm.

In the illustrated embodiment, the elevations and depressions include ridges R and grooves G, such that flow channels for fluids to exchange heat are formed between the heat exchanger elements 110, 120 when the heat exchanger elements 110, 120 are stacked in a stack to form the heat exchanger 100 by providing contact points between at least some crossing ridges and grooves of neighbouring heat exchanger elements 110, 120 under formation of the flow channels for fluids to exchange heat. The pressed pattern of the plates of FIG. 1 comprises a herringbone pattern. The pressed pattern may comprise any suitable pattern or combination of patterns. The pressed pattern is adapted to keep the heat exchanger elements 110, 120 on a distance from one another, except from the contact points, to form the flow channels. The ridges R and grooves G are elongated. For example, the ridges R and grooves G extend in an oblique angle between a side of the heat exchanger elements 110, 120, such as a long side thereof, and a center line, such as a center line extending between short sides, to form a chevron, wherein the ridges and grooves continue, e.g. in a mirrored oblique angle, to the opposite side, such as the opposite long side. For example, the ridges R and grooves G extend between opposite long sides in a herringbone pattern with the chevron in the middle. Alternatively, the ridges R and grooves G extend from one long side to the opposite long side in straight oblique lines.

In the illustrated embodiment, each of the heat exchanger elements 110, 120 is surrounded by a skirt S, which extends generally perpendicular to a plane of the heat exchanger element and is adapted to contact skirts of neighbouring heat exchanger elements 110, 120 in order to provide a seal along the circumference of the heat exchanger or at least a main part of the heat exchanger. In the embodiment of FIG. 1, the skirt S is arranged continuously along opposite sides of the heat exchanger elements 110, 120, such as along the two long sides in the case of a rectangular heat exchanger as illustrated. In the illustrated embodiment, the skirt S is also arranged continuously along one of the short sides of the heat exchanger elements 110, 120.

The heat exchanger elements 110, 120 are arranged with port openings O1-O4 for letting fluids to exchange heat into and out of the flow channels. In the illustrated embodiment, the heat exchanger elements 110, 120 are arranged with a first port opening O1, a second port opening O2, a third port opening O3 and a fourth port opening O4. Areas surrounding the port openings O1 to O4 are provided at different levels such that selective communication between the port openings and the flow channels is achieved. In the heat exchanger 100, the areas surrounding the port openings O1-O4 are arranged such that the first and second port openings O1 and O2 are in fluid communication with one another through some flow channels, whereas the third and fourth port openings O3 and O4 are in fluid communication with one another by neighboring flow channels. In the illustrated embodiment, the heat exchanger elements 110, 120 are rectangular with rounded corners, wherein the port openings O1-O4 are arranged near the corners. Alternatively, the heat exchanger elements 110, 120 are square, e.g. with rounded corners. Alternatively, the heat exchanger elements 110, 120 are circular, oval or arranged with other suitable shape, wherein the port openings O1-O4 are distributed in a suitable manner. In the illustrated embodiment, each of the heat exchanger elements 110, 120 is formed with four port openings O1-O4. In other embodiments of the invention, the number of port openings may be larger than four, i.e. six, eight or ten. For example, the number of port openings is at least six, wherein the heat exchanger is configured for providing heat exchange between at least three fluids. Hence, according to one embodiment, the heat exchanger is a three circuit heat exchanger having at least six port openings and in addition being arranged with or without at least one integrated suction gas heat exchanger.

The heat exchanger 100 according to FIG. 1 comprises a cover plate 130 and an end plate 140. For example, the cover plate 130 and the end plate 140 are of conventional design.

Figure 2:
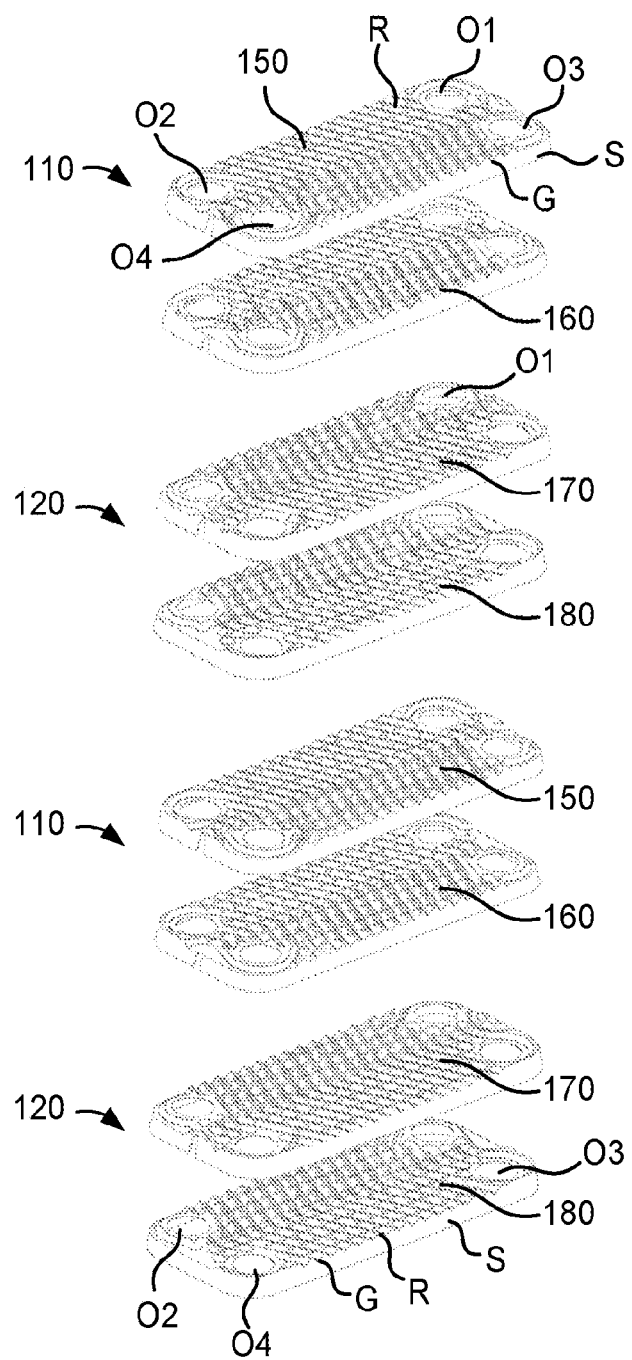
FIG. 2 is a schematic and exploded perspective view of a plurality of double wall plate heat exchanger elements according to one embodiment, wherein each double wall plate heat exchanger element comprising two plates.

With reference to FIG. 2 the heat exchanger 100 comprising a plurality of heat exchanger elements 110, 120 is illustrated schematically according to one embodiment without the cover plate 130 and the end plate 140 to illustrate the structure of the heat exchanger elements 110, 120. Each heat exchanger element 110, 120 comprises a plurality of plates forming the heat exchanger elements as double wall plate heat exchanger elements. In the illustrated embodiment, the first heat exchanger element 110 comprises a first plate 150 and a second plate 160, wherein the second heat exchanger element 120 comprises a third plate 170 and a fourth plate 180 to form the double wall structure of each of the heat exchanger elements 110, 120. For example, the first heat exchanger element 110 is formed by the first and second plates 150, 160, wherein the second heat exchanger element 120 is formed by the third and fourth plates 170, 180. The plates 150-180 are formed with ridges R and grooves G to form the ridges R and grooves G of the heat exchanger elements 110, 120. The ridges R and grooves G of the plates 150-180 in the same heat exchanger element 110, 120 are received in each other, whereas the ridges R and grooves G of the heat exchanger elements 110, 120 are arranged to form the flow channels between them. Hence, in the illustrated embodiment the ridges R of the second plate 160 are received in the ridges R of the first plate 150 to form the first heat exchanger element 110, wherein the ridges R of the fourth plate 180 are received in the ridges R of the third plate 170 to form the second heat exchanger element 120. The double wall structure is for a fluid leaking from a flow channel. Flow channels are arranged between heat exchanger elements 110, 120 and are for heat exchange between fluids flowing in different flow channels. The flow channel is formed between the second plate 160 and the third plate 170. For example, there are no flow channels between the plates of the same heat exchanger element 110, 120, wherein there are no such flow channels between the first and second plates 150, 160 of the first heat exchanger element 110, and there are no such flow channels between the third and fourth plates 170, 180 of the second heat exchanger element 120. When a stack of the plates 150-180 is brazed to form the heat exchanger 100 the plates 150-180 are joined to each other in brazing joints.

Figure 3:
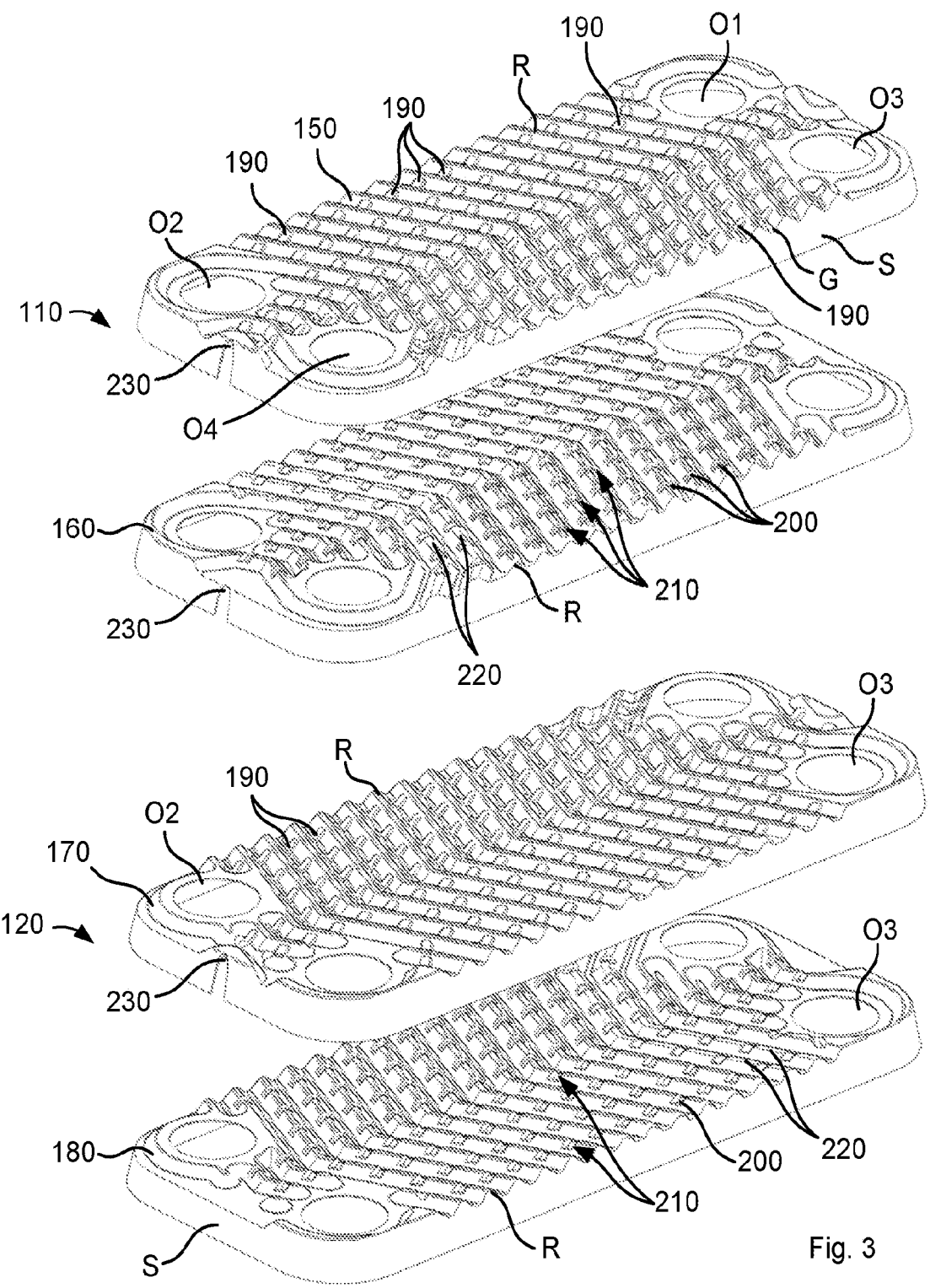
FIG. 3 is a schematic and exploded perspective view of a first double wall plate heat exchanger element and a second double wall plate heat exchanger element according to one embodiment, wherein the first double wall plate heat exchanger element comprises a first and a second plate and wherein the second double wall plate heat exchanger element comprises a third and a fourth plate.

With reference also to FIG. 3 the heat exchanger elements 110, 120 are illustrated more in detail according to one embodiment, wherein the plates 150-180 are formed with cooperating elevations 190 and indentations 200 forming leakage channels 210 for fluid leaking from a flow channel. The elevations 190 and indentations 200 are distributed to provide a plurality of leakage channels 210 in the plates 150-180. The leakage channels 210 are arranged to collect leaking fluid from a flow channel, i.e. from the opposite side of the plate. Hence, the leakage channels 210 are arranged for collecting a fluid leaking through a plate, such as through a hole in the plate, or to the opposite side of a plate by a faulty or broken brazing joint, such as around port openings O1-O4 or at the peripheral skirt S. The leakage channels 210 extend across the ridges R and grooves G of the heat exchanger elements 110, 120. The leakage channels 210 are distributed over the surface of the plates 150-180. For example, the plates 150-180 are rectangular, wherein the leakage channels 210 are distributed over a width of the plates and extend in a longitudinal direction of the plates. Hence, there is a gap between neighbouring leakage channels 210. For example, the plates are in contact with each other between the leakage channels 210 to provide efficient heat transfer. For example, the leakage channels 210 are relatively narrow, so that the gap between them covers a bigger area of the plates than the leakage channels 210. In the illustrated embodiment, the leakage channels 210 extend substantially in parallel to each other.

The leakage channels 210 of each heat exchanger element 110, 120 are connected to each other within the same heat exchanger element 110, 120 through at least one connecting space 220. The connecting space 220 connects the leakage channels 210 with a leakage outlet 230. For example, the connecting space 220 connects the leakage channels 210 with a few leakage outlets, such as not more than 4 leakage outlets or not more than two leakage outlets. In the illustrated embodiment, the connecting space 220 connects all leakage channels of a heat exchanger element 110, 120 with a single leakage outlet 230. In the case of rectangular plates 150-180, the leakage outlet 230 is, e.g. arranged at one single short side of each of the heat exchanger elements 110, 120 as illustrated. Alternatively, leakage outlets are arranged in both short sides of the heat exchanger elements 110, 120. In the illustrated embodiment, the connecting space 220 connects the leakage channels 210 with the leakage outlet 230 through the two central leakage channels. Hence, the connecting space 220 is arranged between a first pair of neighbouring port openings O1, O3 and a second pair of neighbouring port openings O1, O4, for example close to one of the pairs of neighbouring port openings, wherein one or more central leakage channels 210 extend from the connecting space 220, between the port openings of a pair of neighbouring port openings and further to the leakage outlet 230, so that a leaking fluid can be conducted from any of the leakage channels 210 to the leakage outlet 230, such as a single leakage outlet in the short side. The connecting space 220 is elongated and extend in a direction intersecting a plurality of the leakage channels 210 to connect them, so that leaking fluid can flow between the leakage channels 210.

In the illustrated embodiment, the leakage outlet 230 is formed by an aperture in the skirt S of at least one of the plates of a heat exchanger element 110, 120, so that a fluid collected between the plates of a heat exchanger element 110, 120 can exit the heat exchanger 100. For example, the skirt S of three consecutive plates, such as the first, second and third plates 150-170, are formed with the leakage outlet 230 in aligned positions to provide a common leakage outlet from the leakage channels 210 of two adjacent heat exchanger elements 110, 120. The fourth plate 180 is, e.g. formed with a continuous skirt S or at least a skirt not having the corresponding aperture to keep any leaking fluid separated from any leaking fluid from the neighbouring flow channels. Hence, any fluid leaking from one specific flow channel can be collected in a single common leakage outlet 230 regardless of the position of the leak.

Figure 4:
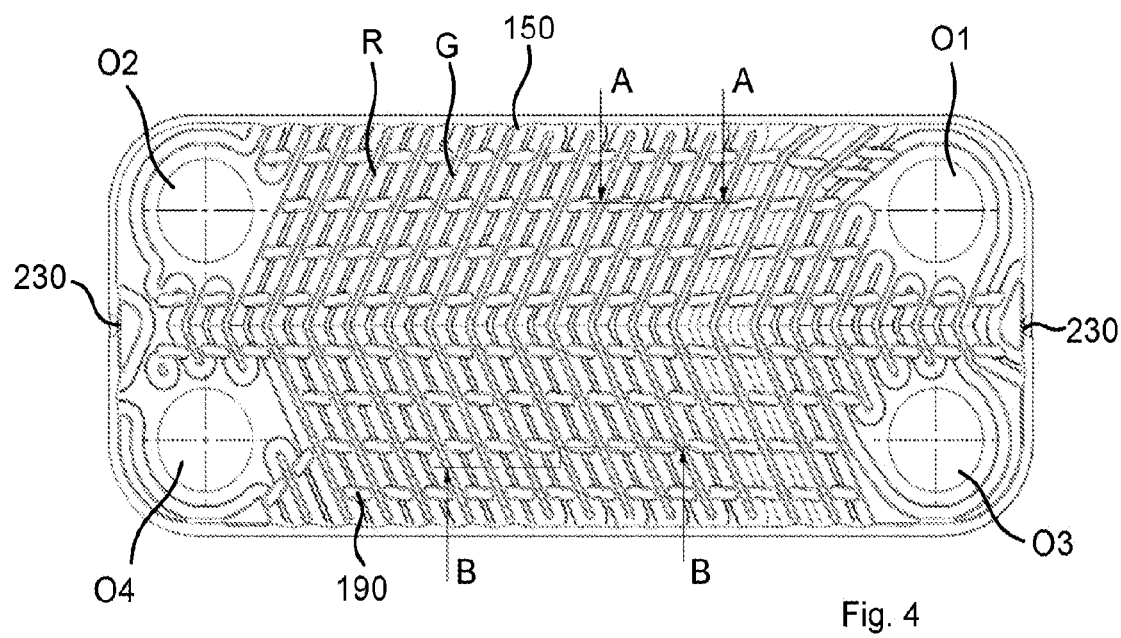
FIG. 4 is a schematic front view of the double wall heat exchanger elements of FIG. 3.
Figure 5:
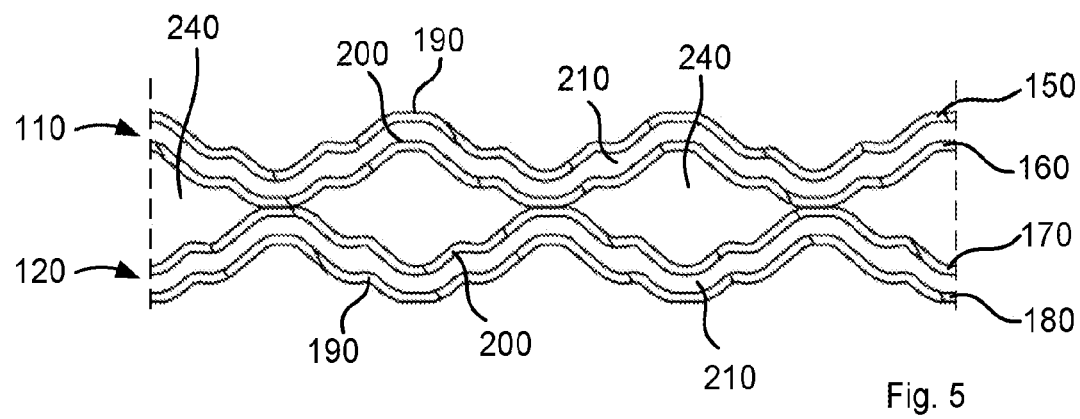
FIG. 5 is a schematic section view along the lines A-A in FIG. 4, illustrating a flow channel between the double wall plate heat exchanger elements and a leakage channel in each of the double wall plate heat exchanger elements.
Figure 6:
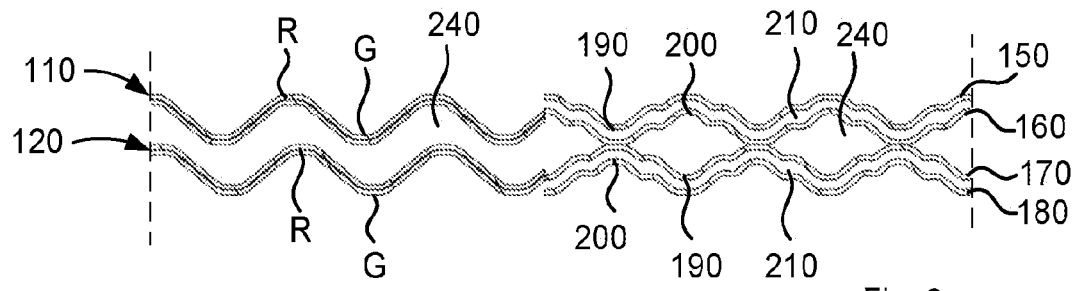
FIG. 6 is a schematic section view along the lines B-B in FIG. 4, illustrating the double wall plate heat exchanger elements partly along a portion of a leakage channel and partly along a portion without a leakage channel.

With reference to FIGS. 4-6 the leakage channels 210 between the plates 150-180 within the same heat exchanger element 110, 120 are illustrated more in detail according to one embodiment. As seen in FIG. 5 the elevations 190 and indentations 200 cooperate to form the leakage channels 210. FIG. 5 has been simplified to better illustrate the flow channel 210. The elevations 190 of every other plate, such as the first plate 150 and the third plate 170, are facing the indentations 200 of the other plates, such as the second plate 160 and the fourth plate 180, to form the leakage channels 210 across the ridges R and grooves G, so that a fluid leaking from the flow channel can be transported along one or more leakage channels 210, such as the leakage channel 210 closest to the leak, and to the leakage outlet 230 and, if necessary, through the connecting space 220. For example, the elevations 190 and the indentations 200 are arranged in rows, such as substantially straight rows in the longitudinal direction of the plates, as seen in FIG. 4. In FIG. 4 the elevations 190 in the grooves G of the first plate 150 can be seen according to one embodiment. For example, the elevations 190 and indentations 200 are arranged to provide at least one or two central leakage channels 210 extending between the first and second port openings O1, O3, along the plate and between the second and fourth port openings O2, O4. As seen in FIG. 6, the plates 150, 160 of the first heat exchanger element 110 and the plates 170, 180 of the second heat exchanger plate 120 are contacting each other in the areas between the elevations 190 and the indentations 200 forming the leakage channels 210 to provide for efficient heat exchange between fluids in the flow channels, which flow channels are indicated in FIGS. and 6 by reference number 240. FIG. 6 has been simplified for illustrative purposes. However, as seen in FIG. 6 the first and second plates 150, 160 contact each other in areas between the leakage channels 210, wherein the third and fourth plates 170, 180 also contact each other in areas between the leakage channels 210, and wherein the flow channel 240 is arranged between the second and third plates 160, 170.

Figure 9:
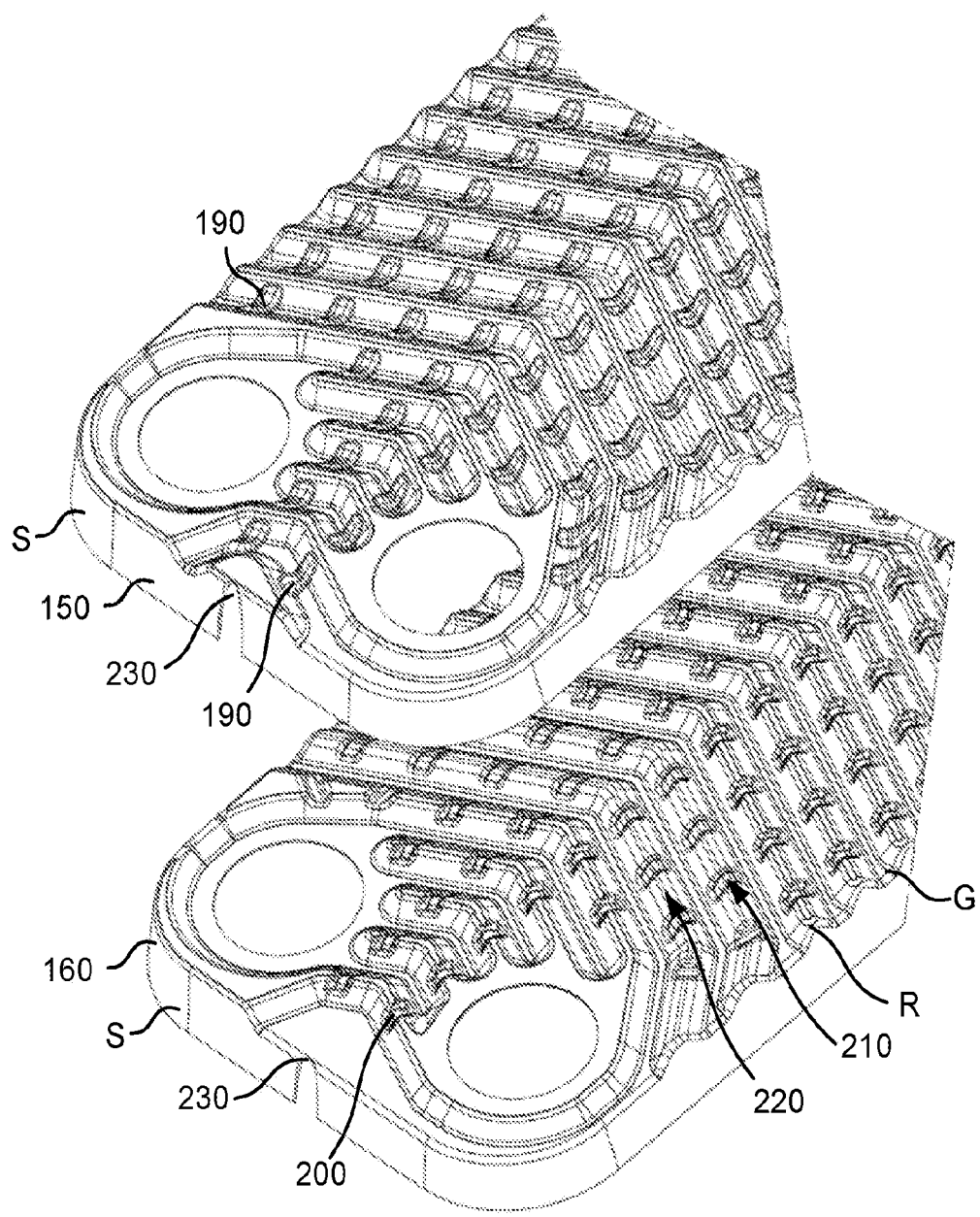
FIG. 9 is a schematic and exploded perspective view of a portion of a double wall plate heat exchanger element according to one embodiment.

With reference to FIGS. 7-9 the connecting space 220 is illustrated more in detail according to one embodiment. At least one connecting space 220 is arranged for connecting the leakage channels 210. For example, 1-10 connecting spaces 220 are provided, such as not more than 6 or not more than 4. According to one embodiment, 2 connecting spaces are provided. The connecting space 220 extends along a ridge R and/or groove G to connect the leakage channels 210 extending in a direction across the ridges R and grooves G. For example, at least one connecting space 220 is provided by one or more ridges R and/or one or more grooves G of selected plates being formed with a different height than the corresponding ridge(s) and/or groove(s) of the other plates, so that the connecting space 220 extends along the gap formed between them. For example, connecting spaces 210 are formed in a number of neighbouring ridges R and/or grooves G, such as 2-10 or 2-6 or 4 neighbouring ridges R and/or grooves G. As seen in simplified FIG. 8, the connecting spaces 220 are provided by two grooves G of the first plate 150 being arranged with a smaller height than the corresponding grooves G of the second plate 160, wherein the second plate 160 is formed with two ridges R having a smaller height than the corresponding ridges of the first plate 150. In FIG. 8, the first and second plates 150, 160 are illustrated. However, the principle for the connecting space(s) 220 is the same for the third and fourth plates 170, 180. In FIG. 8 connecting spaces 220 are provided by two ridges R of the second plate 160 being arranged with a smaller height than the two corresponding ridges R of the first plate 150. Hence, the connecting space(s) 220 is/are provided by a gap between the plates along a ridge R and/or groove G, wherein leaking fluid can be transported to and from the leakage channels 210 through the connecting space(s) 220 and further to the leakage outlet 230 regardless of where the leak is located. For example, the connecting space(s) 220 is/are formed by one or more ridges R and/or grooves G having a press depth smaller than the corrugation depth of the plates, such as a depth of 60-95% or 80-95% of the corrugation depth. The other ridges R and grooves G of the plates 150-180 are for example in substantially full contact with each other in a snug fit for efficient heat transfer. Hence, only a single connecting space 220 or a selected few connecting spaces 220 is/are provided. For example, the connecting space 220 is arranged close to a pair of neighbouring port openings O1-O4 but not between any pair of neighbouring port openings O1-O4, so that the connecting space 220 can connect leakage channels 210 distributed over substantially the entire width of heat exchange elements 110, 120. For example, the last full length ridge(s) R and/or groove(s) G is/are arranged to provide the connecting space(s) 220 for connecting the leakage channels 210 and the leakage outlet 230. Alternatively, a plurality of connecting spaces 220 are distributed over the surface of the plates to connect the leakage channels 210 in different locations in the longitudinal direction of the plates. Alternatively, the connecting space 220 is formed by elevations and/or indentation in the plates to connect leakage channels 210.

On example of a leakage flow is illustrated in FIG. 7 by means of dashed arrows from a point of leak to the leakage outlet 230. The point of leak is illustrated by means of a dot, which in this case is a hole in the second plate 160, wherein fluid from the flow channel 240 between the second and third plates 160, 170 enters between the second plate 160 and the first plate 150. The leaking fluid will make its way to a leakage channel 210, such as the nearest leakage channel 210, formed by cooperating elevations 190 and indentations 200. The leaking fluid can then flow freely and rapidly along the leakage channel 210 to the connecting spaces 220, wherein the leaking fluid can flow from one leakage channel 210 to another leakage channel 210 leading to the leakage outlet 230.

The invention claimed is:
1. A double wall plate heat exchanger comprising: a plurality of double wall plate heat exchanger elements, wherein said heat exchanger elements are formed with a pattern of ridges and grooves providing contact points between at least some crossing ridges and grooves of neighboring heat exchanger elements under formation of flow channels between the heat exchanger elements for fluids to exchange heat, said flow channels being in selective fluid communication with each other through port openings of the heat exchanger elements, wherein each of the heat exchanger elements comprises at least two joined plates, wherein said plates are formed with ridges and grooves to form the pattern of ridges and grooves of the heat exchanger elements, and wherein leakage channels are formed between the plates of each heat exchanger element for fluid leaking from a flow channel; wherein the plates are provided with cooperating elevations and indentations forming the leakage channels extending across the ridges and grooves between the plates of each heat exchanger element;

at least one connecting space formed between the plates of each heat exchanger element, said at least one connecting space connecting the leakage channels between the plates of each heat exchanger element; and the at least one connecting space is connected to a leakage outlet.

2. The double wall plate heat exchanger of claim 1, wherein the at least one connecting space extends along a ridge and/or groove of the plates.

3. The double wall heat exchanger of claim 1, wherein each heat exchanger element comprises not more than 8 connecting spaces, not more than 6 connecting spaces or not more than 4 connecting spaces.

4. The double wall plate heat exchanger of claim 1, wherein the leakage channels between the plates of each heat exchanger element are connected to not more than two leakage outlets or a single leakage outlet.

5. The double wall plate heat exchanger of claim 1, wherein the leakage outlet is arranged in a short side of a rectangular heat exchanger element.

6. The double wall plate heat exchanger of claim 1, wherein the plates and the heat exchanger elements are rectangular, and joined by brazing, wherein long sides of the plates are joined by a continuous brazing joint.

7. The double wall plate heat exchanger of claim 1, wherein the port openings are arranged at different levels to provide the selective fluid communication between flow channels.

8. The double wall plate heat exchanger of claim 1, wherein a leakage sensor is provided at the periphery of the heat exchanger plates to detect leakage from the leakage outlet.

9. The double wall plate heat exchanger of claim 1, wherein the leakage channels extend in a longitudinal direction of the plates, are arranged in parallel and are distributed over a width of the plates.

10. The double wall plate heat exchanger of claim 1, comprising at least a first heat exchanger element and a second heat exchanger element, wherein the first heat exchanger element comprises a first plate joined to a second plate, wherein the second heat exchanger element comprises a third plate joined to a fourth plate, wherein grooves of the first plate and the third plate are provided with the elevations across said grooves, and ridges of the second plate and the fourth plate are provided with the indentations across said ridges, wherein said indentations and elevations cooperate to form the leakage channels between the first and second plates and between the third and fourth plates for collecting fluid leaking from the flow channel between the first and second heat exchanger elements, and wherein the connecting spaces are provided between the first and second plates and between the third and fourth plates.

11. The double wall plate heat exchanger of claim 1, wherein the connecting space(s) is/are formed by at least one of the ridges and/or at least one of the grooves of selected plates being formed with a different height than the corresponding ridge(s) and/or groove(s) of the other plates.

12. The double wall plate heat exchanger of claim 11, wherein the connecting space(s) is/are formed by one or more ridges and/or grooves of one of the plates of each of the heat exchanger elements being formed with a different height than the corresponding ridge(s) and/or grooves of the other plate.

13. The double wall plate heat exchanger of claim 1, wherein the plates are provided with peripheral skirts, and wherein the skirt of three consecutive plates are formed with the leakage outlet in the form of an aperture to provide a common leakage outlet from the leakage channels of two adjacent heat exchanger elements.

14. The double wall plate heat exchanger of claim 13, wherein the apertures are aligned.

15. The double wall plate heat exchanger of claim 14, wherein the three consecutive plates with the aligned apertures in the skirt are followed by a plate not having a corresponding aperture in the skirt and thereby preventing any mixing of fluids leaking from flow channels next to each other.

* * * * *